United States Patent [19]

Peeters et al.

[11] Patent Number: 5,790,550
[45] Date of Patent: Aug. 4, 1998

[54] METHOD FOR ALLOCATING DATA ELEMENTS TO A SET OF CARRIERS, MAPPING UNIT AND MODULATOR TO PERFORM THIS METHOD

[75] Inventors: Johan Peeters; Paul Marie Pierre Spruyt, both of Heverlee; Jean-Francois Van Kerckhove, Nethen, all of Belgium

[73] Assignee: Alcatel NV, Netherlands

[21] Appl. No.: 675,323

[22] Filed: Jul. 10, 1996

[30] Foreign Application Priority Data

Jul. 11, 1995 [EP] European Pat. Off. .............. 95201899

[51] Int. Cl.$^6$ ..................................................... H04J 1/00
[52] U.S. Cl. ............................................. 370/480; 370/333
[58] Field of Search ..................................... 370/480, 498, 370/503, 332, 333, 317, 337, 338, 321, 347, 343, 350, 366; 379/93.31; 375/227, 284, 285, 274, 239, 254, 296, 335, 346; 455/504, 501, 502, 503, 63, 23

[56] References Cited

U.S. PATENT DOCUMENTS

| | | | |
|---|---|---|---|
| 4,679,227 | 7/1987 | Hughes | 379/93.31 |
| 5,301,052 | 4/1994 | Audouin et al. | 370/480 |
| 5,361,254 | 11/1994 | Storck et al. | 370/480 |
| 5,400,322 | 3/1995 | Hunt et al. | 370/468 |

OTHER PUBLICATIONS

IBM Technical Disclosure Bulletin, vol. 34, No. 7B, Dec. 1991, pp. 373–376, "Greedy Waterpouring Recipe for Fourier Transform".

Twenty–Sixth Annual Allerton Conference on Communications, Control, and Computing, 28–30 Sep. 1988, Monticello, US, pp. 473–479. "Fourier transform coding for peak limited channels".

draft American National Standard for Telecommunications on ADSL (Asymmetric Digital Subscriber Line, by ANSI in Apr. 1994.

"Performance of Multicarrier with DSL Impulsed Noise" by P.S. Chow, J.M. Cioffi and R.K. Maxwell, Reference No. T1E1.4/91–159.

"A Multicarrier E11–HDSL Transceiver System with Coded Modulation" by Chow et al. published in NR 3 May/Jun. 1993 of the Journal of European Transactions, 257–266.

"Performance Evaluation of a Multichannel Transceiver System for ADSL & VHDSL Services" by Chow et al. issue Nr. 6 Aug. 1991 of Journal of European Trans.etal, pp. 909–919.

*Primary Examiner*—Dang Ton
*Attorney, Agent, or Firm*—Ware, Fressola, Van Der Sluys & Adolphson LLP

[57] ABSTRACT

To allocate a number of data elements to a set of carriers, the carriers are divided into N subsets of carriers according to a predetermined carrier criterion whilst the data elements are classified into N groups of data elements according to a predetermined data criterion, N being an integer greater than one. The predetermined data and carrier criterion have a relation on the basis of which the N subsets of carriers are associated one by one to the N groups of data elements. The data elements classified in such a group are then allowed to be modulated only on carriers which form part of the subset associated with this group. In addition, for each subset of carriers and related group of data elements, the distribution is obtained by means of information from subset dependent 'required SNR (Signal to Noise Ratio) per data element'-tables and previously carried out SNR measurements for each carrier.

14 Claims, 3 Drawing Sheets

| NUMBER OF BITS ALLOCATED | REQUESTED SNR (dB) |
|---|---|
| 1 | 16 |
| 2 | 16 |
| 3 | 20 |
| 4 | 23 |
| 5 | 25 |

| NUMBER OF BITS ALLOCATED | REQUESTED SNR (dB) |
|---|---|
| 1 | 15 |
| 2 | 15 |
| 3 | 21 |
| 4 | 24 |
| 5 | 27 |

| CARRIER | MEASURED SNR (dB) |
|---|---|
| f11 | 17 |
| f1 | 22 |
| f2 | 16 |
| f10 | 22 |
| f3 | 23 |
| f9 | 19 |
| f8 | 22 |
| f4 | 23 |
| f7 | 26 |
| f6 | 26 |
| f5 | 18 |

METHOD FOR ALLOCATING DATA ELEMENTS TO A SET OF CARRIERS, MAPPING UNIT AND MODULATOR TO PERFORM THIS METHOD

TECHNICAL FIELD

The present invention relates to a method for allocating data elements to a set of carriers, a mapping unit to perform this method and a modulator equipped with such a mapping unit.

BACK OF THE INVENTION

Such a method and such equipment to perform the method are already known in the art, e.g. from the U.S. Pat. No. 4,679,227, entitled 'Ensemble modem structure for imperfect transmission media' from the inventor Dirk Hughes-Hartogs. Therein, a modem is described which transmits and receives digital data on a set of carriers called an ensemble of carrier frequencies. The modem includes a system for variably allocating data elements or data, and power to the carrier frequencies to be transmitted via a telephone line. In a first step, the method performed by this data and power allocating system determines for each carrier frequency the equivalent noise component. Obviously, this is equal to measuring for each carrier frequency the signal to noise ratio (SNR) provided that the signal power during this measurement equals 1 power unit. As is described on lines 21–24 of column 11 of the above mentioned U.S. Patent, the equivalent noise components are used in combination with the signal to noise ratios necessary for transmission of the data elements with a given maximum bit error rate (BER) to calculate therefrom the required transmission power levels, marginal required power levels for each carrier frequency and data element allocation. As stated on lines 26–27 of column 11 of U.S. Pat. No. 4,679,227, these signal to noise ratios necessary for transmission of the data elements are well known in the art, and are found in a table which is called a 'required SNR per data element'-table in the present patent application. The data elements in the known method are then allocated one by one to the carriers requiring the lowest power cost to increase the constellation complexity. In this way, the known method and modem provide a data element allocation to compensate for equivalent noise and to maximize the overall data transmission rate. The known method and modem however treat all data elements in an identical way. In communication networks transporting data elements for different applications and services, the requirements for noise compensation, bit error rate, data transmission rate, bandwidth and so on, may depend on the type of application or service. Several types of data, each of which characterized by its own requirements and specifications, can thus be distinguished.

SUMMARY OF THE INVENTION

An object of the present invention is to provide a method and equipment of the above known type but which take into account data depending requirements for noise compensation, transmission rate and so on, and wherein data element allocation and transmission for each type of data are thus tuned to its own specifications.

According to the invention, this object is by a method for allocating data elements to a set of carriers for transmission thereof in a communication network, said method including deciding which number of said data elements has to be allocated to a carrier of said set of carriers and measuring a signal to noise ratio for said carrier and combining said signal to noise ratio with information from a 'required SNR per data element'-table which defines the required signal to noise ratio per data element allocated to a said carrier, characterized in that said set of carriers is divided into N subsets of carriers according to a predetermined carrier criterion, N being an integer number greater than one, and said N subsets constituting an adaptable partition of said set of carriers, whereby to each of said subsets is associated an own 'required SNR per data element'-table which defines the required signal to noise ratio per data element allocated to a said carrier forming part of said subset of carriers, and furthermore that each said data element, before being allocated to a said carrier, is classified in one out of N groups of data elements according to a predetermined data criterion, there being a relation between said predetermined data criterion and said predetermined carrier criterion on the basis of which each of said N groups of data elements is associated with a said subset of carriers in such a way that a said data element, classified in a said group, is allocated to a said carrier forming part of said subset associated with said group.

It is also achieved by a mapping unit for allocating data elements to a set of carriers for transmission thereof in a communication network, said mapping unit including a signal to noise ratio (SNR) memory provided to store for each carrier of said set of carriers a signal to noise ratio value, a table memory provided to store a 'required SNR per data element'-table defining the required signal to noise ratio per data element allocated to a said carrier, and a processor to a first input of which said data elements are applied, and to second and third inputs of which, outputs of said SNR memory and said table memory are connected respectively, said processor being adapted to combine for each said carrier, said signal to noise ratio value with information in said 'required SNR per data element'-table to decide which number of said data elements to allocate to each said carrier, characterized in that said table memory is subdivided into N table memories, N being an integer greater than one, each table memory being associated with one of N subsets of carriers and provided thus to store a 'required SNR per data element'-table defining the required signal to noise ratio per data element allocated to a carrier of said associated subset of carriers, and furthermore that said processor is adapted to divide said set of carriers, according to a predetermined carrier criterion, into said N subsets of carriers constituting an adaptable partition of said set of carriers, to classify said data elements, according to a predetermined data criterion, into N groups of data elements, said predetermined carrier criterion and said predetermined data criterion having a relation on the basis of which each of said N groups of data elements is associated with a said subset of carriers, and to allocate said data elements to said carriers in such a way that said data elements classified in a said group of data elements are allocated to said carriers forming part of said subset associated with said group.

It is still further achieved by a modulator for modulation of data elements applied to an input thereof on a set of carriers for transmission thereof in a communication network coupled to an output thereof, said modulator including between said input and said output a cascade connection of a mapping unit, a transformation unit, a parallel to serial converter and a digital to analog converter, said mapping unit being provided to allocate said data elements to said set of carriers and to thereby generate a frequency domain parallel sequence of data, said transformation unit being included to transform said frequency domain parallel sequence of data applied to its input and to thereby generate a time domain parallel sequence of data, said parallel to serial converter being adapted to convert said time domain parallel sequence of data into a serial sequence of data which is applied to said digital to analog converter included to transform said serial sequence of data into an analog signal and to supply said analog signal to said output of said modulator, said mapping unit including a signal to noise ratio (SNR) memory provided to store for each carrier of said set of carriers a signal to noise ratio value, a table memory provided to store a 'required SNR per data element'-table defining the required signal to noise ratio per data element allocated to a said carrier, and a processor to a first input of which said data elements are applied, and to second and third inputs of which, outputs of said SNR memory and said table memory are connected respectively, said processor being adapted to combine for each said carrier, said signal to noise ratio value with information in said 'required SNR per data element'-table to decide which number of said data elements to allocate to each said carrier, characterized in that said table memory (TM) is subdivided into N table memories, N being an integer greater than one, each table memory being associated with one of N subsets of carriers and provided thus to store a 'required SNR per data element'-table defining the required signal to noise ratio per data element allocated to a carrier of said associated subset of carriers, and furthermore that said processor is adapted to divide said set of carriers, according to a predetermined carrier criterion, into said N subsets of carriers constituting an adaptable partition of said set of carriers, to classify said data elements, according to a predetermined data criterion, into N groups of data elements, said predetermined carrier criterion and said predetermined data criterion having a relation on the basis of which each of said N groups of data elements is associated with a said subset of carriers, and to allocate said data elements to said carriers in such a way that said data elements classified in a said group of data elements are allocated to said carriers forming part of said subset associated with said group. Indeed, in the above method described in claim 1, data elements are, according to a predetermined data criterion, e.g. the maximum allowable bit error rate, the required bandwidth, the required data transmission rate, the required compensation for noise, the required compensation for burst errors, . . . , or a combination thereof, classified into N groups of data elements. Each group of data elements becomes modulated on a subset of carriers, these carriers being selected out of the full available set of carriers in accordance with another specific criterion, called a predetermined carrier criterion, e.g. the sensitivity of a carrier frequency for noise, the sensitivity of a carrier frequency for burst errors, . . . Based on the relation between data and carrier criteria, the N groups of data elements are linked one by one to the N subsets of carriers. In this way, the carrier specific properties are tuned in to the requirements for transmission of specific groups of data.

In addition, by using signal noise ratio measurements in combination with information from a 'required SNR per data element'-table, a distribution of data elements requiring the lowest overall power transmission is found in a similar way as described in the earlier cited U.S. Patent, noticing that each group of data elements in the present method is related to its own 'required SNR per data element'-table which renders the allocation method more accurate.

A further feature of the present data allocation method is that in a particular first implementation thereof, the predetermined data criterion is equal to service dependent required compensation for occasional noise increase. Telephone service for example will have lower requirements with respect to protection against occasional noise increase than telebanking service wherein all data have to be transmitted faultless. The predetermined carrier criterion in this first implementation is defined as the sensitivity of a carrier for such occasional noise increase.

Different sources of such occasional noise increase can be thought off. Burst errors on transmission links in a network for example may damage a sequence of data elements and should thus be seen as a first type of occasional noise increase. A well known technique for compensation of such burst errors is the addition of an error protection code in combination with interleaving of data elements. Such an error protection code adds redundancy at the cost of user data transmission rate whilst interleaving introduces delay effects which enlarge when the depth of interleaving increases. In a particular embodiment of the above mentioned first implementation of the present method, the length of a possibly used error protection code and the complexity of a possibly applied interleaving are minimized by allocating data provided by services with high error compensation requirements to carriers which are least sensitive for these errors.

As indicated in paragraph 6.11.1 on page 45 of the draft American National Standard for Telecommunications on ADSL (Asymmetric Digital Subscriber Line), published by ANSI (American National Standards Institute) in April 1994, clipping of the output signal of the transmitter should be seen as another source of occasional noise increase.

Another characteristic feature of the present method, is that in a particular embodiment of the first implementation, the sensitivity for occasional noise increase of a carrier is estimated by measuring the noise power No on this carrier and inverting the measured result. Indeed, as will be proven later on in the description, 1/No is equal to the variation of the carrier's signal noise ratio (SNRdB) in decibels as a function of the noise power on this carrier. This variation of the signal to noise ratio obviously is a measure for the sensitivity of the carrier.

Yet another feature of the present method, is that in an alternative embodiment of the first implementation, the sensitivity for occasional noise increase of a carrier is estimated by calculating the variation of the bit error rate (BER) of this carrier as a function of the noise power on this carrier. Indeed, the variation of the bit error rate (BER) obviously is also a measure for the sensitivity of the carrier.

Also in an alternative embodiment of the first implementation, the sensitivity for occasional noise increase of a carrier is obtained from a spectrum for impulsive noise. Such a spectrum is shown e.g. in FIG. 4 of the contribution to the ANSI T1E1.4 working group with reference number T1E1.4/91-159, entitled 'Performance of Multicarrier with DSL Impulse Noise', and written by P S. Chow, J. M. Cioffi and R. K. Maxwell.

Still a further characteristic feature of the present method is that the occupation of the carriers with data elements is improved by sharing N−1 carriers between two data element groups. In the present application, such carriers are called mixed carriers. To assign subsets of carriers to groups of data elements, all carriers are fictively arranged in increasing order or decreasing order of the predetermined carrier criterion (e.g. in increasing order of sensitivity of the carrier for burst errors). A first subset of e.g. 4 carriers is then associated with a first group of data elements, a second subset of e.g. 7 carriers is associated with a second group of data elements having e.g. lower noise compensation requirements than the first group of data elements, and so on. Once having allocated the data elements, the fourth carrier of the first subset however may be partially unoccupied by data elements of the first group and therefore can be used as a mixed carrier, to which also data elements of the second group are allocated. By extrapolation of the above example, it is seen that for N groups of data elements, a maximum amount of N−1 mixed carriers is thus allowed.

Still another characteristic feature is that the present data allocation method is dedicated to minimize overall power transmission. This means that, once the allocation is performed, it has become impossible to reduce the overall power transmission by removing a data element from the carrier and allocating it to another carrier. The possibility to reduce the overall power transmission by removing a data element from a carrier to another carrier forming part of the same subset of carriers is eliminated by applying the water-filling principle described in the already cited U.S. Patent to distribute data elements of a group of data elements to carriers of the associated subset of carriers. In an implementation of this waterfilling principle, data elements can be allocated one by one to the carrier having the largest signal to noise ratio margin. This signal to noise ratio margin therefor has to be calculated for each carrier by subtracting from the signal to noise ratio value measured for this carrier, the required signal to noise ratio value to enable allocating data elements thereto. This required signal to noise ratio value is found in the 'required SNR per data element'-tables already mentioned. On the other hand, the possibility to reduce overall power transmission by applying another partition into subsets of carriers has to be eliminated. Whenever this possibility exists, the carriers should be redivided into subsets of carriers which are tuned better to the number of data elements in the different groups. Such a situation would occur when a large number of data elements is allocated to a subset of carriers with a small capacity with respect to the 'required SNR per data element'-table specific to this subset, whilst a small number of data elements is allocated to a subset of carriers with a large capacity with respect to the 'required SNR per data element'-table specific to this latter subset. In the latter subset of carriers, the signal to noise ratio margins will be large, whilst in the former subset of carriers the signal noise ratio margins will be small.

Still considering the fictive situation wherein the carriers are arranged in increasing or decreasing order of signal to noise ratio (SNR), no intermediate carriers may be left unoccupied since this would imply that carriers having worse properties are used instead of these intermediate carriers.

In a second specific implementation of the present method digital data are Discrete Multi Tone (DMT) modulated on a set of carriers for transmission thereof, in accordance with the already mentioned draft ANSI Standard on ADSL, via a telephone line. For a more precise description of the Discrete Multi Tone (DMT) modulation, reference is made to the article 'A Multicarrier E1-HDSL Transceiver System with Coded Modulation', written by Peter S. Chow, Naofal Al-Dhahir, John M. Cioffi and John A. C. Bingham and published in the issue Nr. 3 May/June 1993 of the Journal of European Transactions on Telecommunications and Related Technologies (ETT), pages 257–266 and from the article 'Performance Evaluation of a Multichannel Transceiver System for ADSL and VHDSL Services' from Peter S. Chow et aL, published in the issue Nr. 6 Aug. 1991 of the Journal of European Transactions on Telecommunications and Related Technologies (ETT), pages 909–919. The carriers of the just mentioned set of carriers have equidistant frequencies. These frequencies, the alternative techniques for ADSL (Asymmetric Digital Subscriber Line) transmission (Frequency Division Multiplexing, Echo Cancellation), and further ADSL transmission requirements are all described in the draft ANSI Standard on ADSL.

In this draft ANSI Standard, it is further stated that one bit constellations are not allowed.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
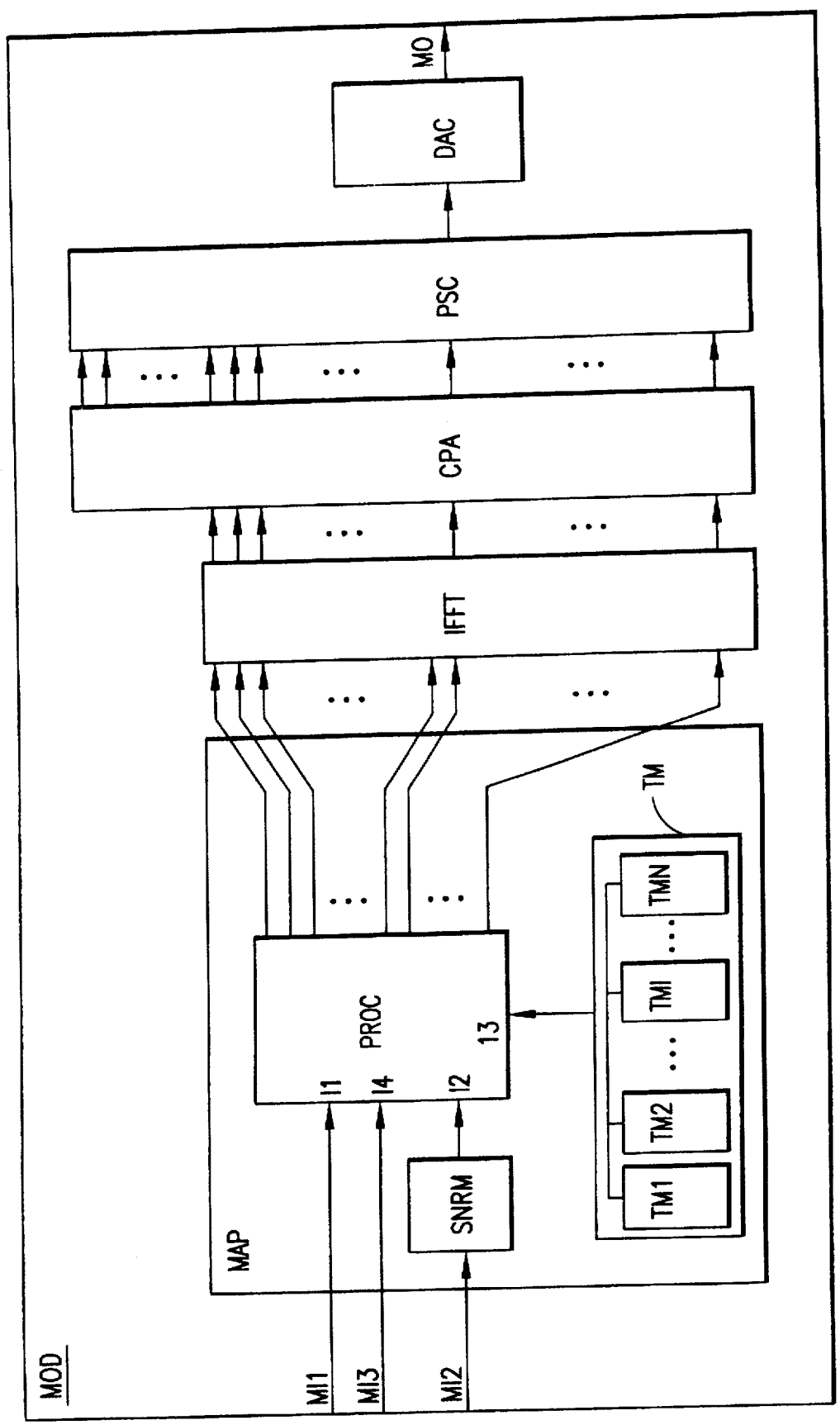
FIG. 1 is a block scheme of an embodiment of a Discrete Multi Tone (DMT) modulator which includes a mapping unit according to the present invention.

Referring to FIG. 1, a Discrete Multi Tone (DMT) modulator MOD used in asymmetrical digital subscriber line (ADSL) applications will be described. This modulator MOD includes a mapping unit MAP which allocates data elements to a set of 256 carriers according to the present invention. First, the working of the modulator MOD will be explained by means of a functional description of the blocks shown in FIG. 1. Based on this description, implementation of the functional blocks in FIG. 1 will be obvious to a person skilled in the art. In addition, the mapping unit MAP and allocation technique performed thereby will be described in further detail.

The Discrete Multi Tone (DMT) modulator MOD includes between a first input MI1 and an output MO the cascade connection of a mapping unit MAP, an inverse fast fourier transform processing unit IFFT, a cyclic prefix adder CPA, a parallel to serial converter PSC, and a digital to analog converter DAC. The mapping unit MAP is equipped with a processor PROC, a signal to noise ratio memory SNRM and N table memories, TM1, TM2, . . . , TM1, . . . , TMN, four of which are shown in FIG. 1. These table memories TM1 . . . TMN form part of one large table memory TM. The processor PROC in the mapping unit MAP is provided with a first input I1 coupled to the modulator input MI1, a second input I2 connected to an output of the signal to noise ratio memory SNRM, a third input I3 connected in parallel to outputs of the N table memories, TM1 . . . TMN and a fourth input I4 coupled to a third input MI3 of the modulator MOD. An input of the signal to noise ratio memory SNRM is coupled to a second input MI2 of the modulator MOD. The processor PROC further is provided with 256 parallel outputs, each of which is connected to a corresponding input of the inverse fast fourier transform processing unit IFFT.

According to the draft ANSI standard on ADSL, mentioned already in the introductory part, the Discrete Multi Tone modulator MOD modulates data elements applied to its first input MI1 on a set of 256 carriers having equidistant frequencies, and further applies the modulated carriers via its output MO to a twisted pair telephone line, not shown in the figure. To be distributed over the 256 carriers, the data elements entering the modulator MOD via MI1 are first applied to the mapping unit MAP which, based on a particular algorithm that will be described later, allocates the data elements to the carriers and decides for each carrier which modulation method has to be executed. To perform this algorithm, the processor PROC is provided with information from first measurements applied thereto via the fourth input 14 and second measurements of the signal to noise ratios, stored in the signal to noise ratio memory SNRM and with information from the 'required SNR per data element'-tables stored in the table memories TM1 ... TMN. The processor PROC for example allocates 2 bits to the first carrier, these 2 bits being modulated on this first carrier via 4 QAM modulation, allocates 4 bits to the second carrier, these 4 bits being modulated on this second carrier via 16 QAM modulation, and so on. In a signal plane, each modulated carrier can be represented by a single point, representing the amplitude and phase of the carrier after modulation. Thus, 256 complex numbers represent the 256 modulated carriers and are therefore outputted parallel at the processors output as a frequency domain parallel sequence of data. This sequence is converted into a time domain parallel sequence of 512 real numbers by the inverse fast fourier transform processor. If the transmission line would be perfect, i.e. if no intersymbol interference would be caused by the impulse response of the transmission line, the time domain parallel sequences of successive symbols could be joined into a serial data stream, transformed into an analogue signal and applied to the transmission line. Due to the effective impulse response length of the transmission line however, intersymbol interference will occur. Such intersymbol interference can be compensated by an adaptive filter at the receiver's side. In known solutions and also suggested in paragraph 6.10 of the above cited draft Standard, such a digital filter technique at the receiver's side is combined with cyclic prefix extension at the transmitter's side to obtain sufficient intersymbol interference compensation. The time domain parallel sequence at the output of the inverse fast fourier transform processing unit IFFT is therefore applied to a cyclic prefix adder CPA which, in accordance with paragraph 6.10 on page 44 of the draft ADSL Standard, appends the last 32 real numbers of the time domain parallel sequence to the 512 real numbers constituting this sequence to thereby generate an extended time domain parallel sequence of 544 real numbers. The extended time domain parallel sequence is then applied to the cascade of parallel to serial converter PSC and digital to analog converter DAC to be successively transformed into a serial digital sequence and analog signal.

The block scheme of the Discrete Multi Tone modulator MOD in FIG. 1 will not be described in further detail since such a detailed description is of no importance for the present invention. Further details with respect to ADSL requirements are described in the already mentioned draft ANSI Standard on ADSL whilst specific implementations of Discrete Multi Tone modulators are found in the articles 'A multicarrier E1-HDSL Transceiver System with Coded Modulation', written by Peter S. Chow, Naofal Al-Dhahir, John M. Cioffi and John A. C. Bingham and published in the issue Nr. 3 May/June 1993 of the Journal of European Transactions on Telecommunications and Related Technologies (ETT), pages 257–266, and 'Performance Evaluation of a Multichannel Transceiver System for ADSL and VHDSL Services' from Peter S. Chow et al., published in the issue Nr. 6 August 1991 of the Journal of European Transactions on Telecommunications and Related Technologies (ETT), pages 909–919.

The present invention more specifically relates to the mapping unit MAP and algorithm executed by the processor PROC therein to allocate data elements applied to the first input I1 to the set of 256 carriers. In the following paragraphs, a detailed description of this algorithm and means included in the mapping unit MAP thereto will be given. However, to avoid overloading the figures accompanying the description of the algorithm, the particular situation is chosen wherein 26 data elements have to be allocated to a set of 11 carriers referred to as f1, ..., f11. Obviously, the algorithm to allocate data elements to a set of 256 carriers is not different from the algorithm to allocate data elements to 11 carriers. Extrapolation of the algorithm described in the following paragraphs is thus obvious to a person skilled in the art.

The Discrete Multi Tone modulator MOD of the preferred embodiment forms part of a full service network not shown in the drawings. The data elements applied to the first input I1 of the processor PROC thus originate from a plurality of services, each of these services having its own requirements and specifications. Telephone speech data or video data for example require less protection against burst errors than telebanking data. On the other hand, telebanking data may be delayed. Besides, it is well known that a carrier property such as the sensitivity for burst errors is frequency dependent and thus different for each of the above mentioned 256 carriers. From these establishments, it follows that some carriers are more likely to be used for modulation of data generated by a particular service than others. In the first three steps of the allocation method performed by the mapper MAP, carriers and data elements will therefore be arranged in subsets and groups according to their properties and requirements respectively. These groups of data elements and subsets of carriers will then be associated to each other in such a way that data elements become allocated to carriers which are tuned to their specific service dependent requirements. In five additional steps, the data elements of each group are distributed over the carriers of the associated subset in order to obtain a satisfying distribution.

Referring to the flow chart and graphs of FIG. 2, a step by step approach of the complete service dependent allocation method performed by the mapping unit will be described now.

Figure 2:
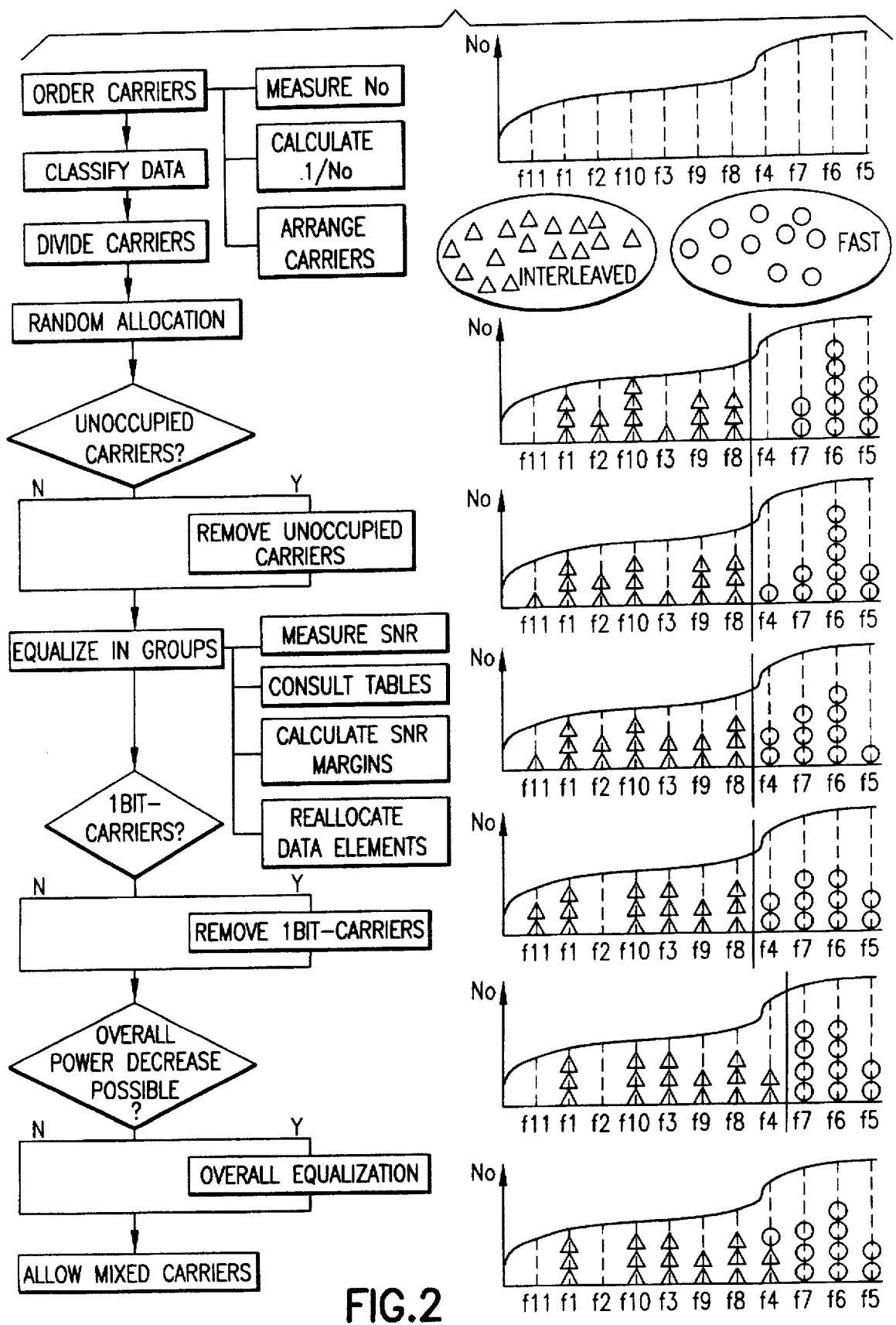
FIG. 2 is a flow chart of the successive steps and substeps constituting an implementation of the method according to the present invention, and includes graphs associated to each step to illustrate the evolution of a particular distribution of data elements when executing these steps.

The sequence of 9 steps and substeps in each of these 9 steps are shown in the flow chart covering the left part of FIG. 2, whilst the evolution of the data element distribution over the set of 11 carriers is drawn in the graphs attached to each step in the right part of FIG. 2.

The mapper MAP of FIG. 1 for the description in the following paragraphs is supposed to classify the data elements in 2 groups: a group of interleaved data and a group of fast data. The classification is performed based upon the requirements with respect to burst error correction for the data elements as well as to acceptable latency. Indeed, data elements which need to be protected against burst errors will be interleaved and therefore will be allocated to carriers with a high sensitivity for burst errors since for these carriers, protection by interleaving is provided. On the contrary, data such as telephone speech data, which have lower requirements with respect to protection against burst errors but are delay sensitive, will not be interleaved but can be allocated to carriers which are less sensitive for burst errors.

The first step of the method, as follows from the flow chart in FIG. 2, is a carrier ordering step. The 11 carriers f1, ... f11 have to be arranged fictively in decreasing order of burst error sensitivity to enable dividing these carriers into two subsets. A measure for this burst error sensitivity of a carrier, as will be proven immediately, is 1/No where No equals the noise power measured on that carrier. Indeed, the burst error sensitivity of a carrier can be expressed as the variation of the signal to noise ratio SNRdB in dB as a function of the noise No, because a burst error is nothing but a variation of the noise No. The numerator in (1) expresses the variation of the SNR margin. Mathematically, such a variation is equal to the differential:

$$\frac{d(SNRdB)}{d(No)} \quad (1)$$

wherein SNRdB represents the signal to noise ratio of a carrier in decibels, and is thus proportional to log (S/No):

$$SNRdB = 10 \cdot \log\left(\frac{S}{No}\right) \quad (2)$$

with S being the signal power on this carrier and No being the noise power on this carrier.

Substituting (2) in (1) and calculating the differential results in:

$$10 \cdot \frac{d\left(\log\frac{S}{No}\right)}{dNo} = \frac{10}{\ln(10)} \cdot \frac{d\left(\frac{S}{No}\right)}{\frac{S}{No}} = \quad (3)$$

$$\frac{10}{\ln(10)} \cdot \frac{\frac{-S}{No^2}}{\frac{S}{No}} = \frac{-1}{No} \cdot \frac{10}{\ln(10)} \propto \frac{1}{No}$$

which proves that the inverse of the noise power No on a carrier is a measure for the burst error sensitivity of this carrier. It is noted that the above result corresponds to the expectation that a carrier which is normally not plagued by noise compared to a carrier which is already plagued by a lot of noise, will sustain relatively more damage from burst errors.

Figures 3, 4, 5:
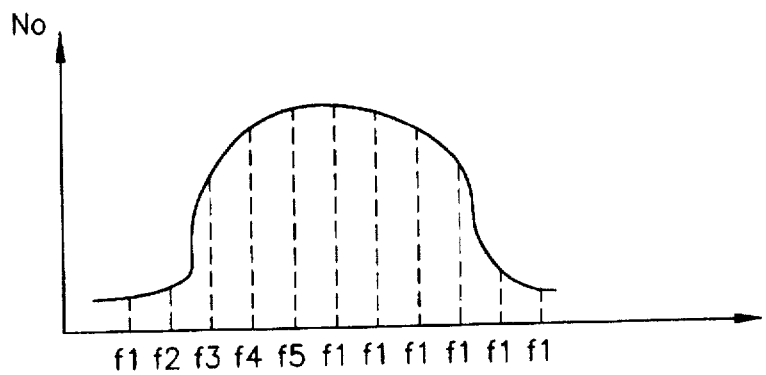
FIG. 3 is a graph wherein for a transmission line, the evolution of the noise power No measured on a carrier as a function of the frequency of this carrier is drawn.
FIG. 4 represents two 'required SNR per data element'-tables, used in several steps of the implementation of the method illustrated by FIG. 2 to build up the distribution shown in the graphs of FIG. 2.
FIG. 5 is a table of measured signal to noise ratio (SNR) values (in dB) for each carrier, also used in the implementation of the method illustrated by FIG. 2.

Step 1 thus contains 3 substeps: a first substep wherein the noise power No for each carrier is measured and wherein these measurements are applied to the processor PROC via its fourth input I4, a second substep wherein the measured results are inverted by the processor PROC, and a third substep wherein the carriers are fictively arranged in decreasing order of noise sensitivity or increasing order of measured noise power No. The noise power No measured on a carrier is frequency dependent for example in a way similar to the graph of FIG. 3. In this example, carriers with low and high frequencies are more noise sensitive than carriers with intermediate frequencies. The sequence of carriers obtained by fictively arranging the 11 carriers is shown in the first graph of FIG. 2.

In the second step of the algorithm, the mapping unit MAP of FIG. 1 classifies the incoming data elements into two groups. As already explained, the requirements with respect to interleaving are used as a criterion for this classification. Once classified, each data element can be considered to carry a label defining whether it forms part of the group of interleaved data or of the group of fast data. In the graphs of FIG. 2 this is shown by representing each data element classified in the group of interleaved data by a small triangle, whilst representing the data elements of the group of fast data by small circles. It is further seen in FIG. 2 that 26 data elements have to be classified in these two groups: 16 data elements thereof belong to group 1, whilst the remaining 10 data elements belong to the second group of fast data. It has to be noticed that in an alternative implementation of the present invention, the data elements are already carrying a label similar to the just mentioned labels when entering the modulator MOD in such a way that it is no longer a task of the mapping unit MAP to partition the data elements in groups.

In the third step, the carriers are divided in two subsets. Considering the carriers f1 ... f11 being arranged in decreasing order of noise sensitivity, the third step is executed by defining the last carrier in the sequence which belongs to subset 1. In the corresponding graph in the right part of FIG. 2, a vertical line is drawn to separate subset 1 carriers from subset 2 carriers. Subset 1 is constituted by carriers f11, f1, f2, f10, f3, f9 and f8, whilst subset 2 contains carriers f4, f7, f6 and f5.

It is noted here that the division in subsets might be based on a dummy rule assigning an equal number of carriers to each subset. More intelligent implementations of the present method however may use a subset composition already stored in an additional memory means, not shown in the drawings, and may adapt this composition according to the number of data elements classified in the several groups in step 2.

In the fourth step, the data elements are allocated randomly to the carriers, i.e. the data elements of the interleaved group are distributed randomly over the carriers of the first subset, whilst the data elements of the fast group are distributed randomly over the second subset of carriers. The so obtained distribution for the example of FIG. 2 is shown in the second graph on the right side of this figure. It is remarked that in alternative embodiments of the modulator according to the present invention, the data elements can be allocated to the carriers of their associated subset in a way based on a previously established distribution which was stored in a memory means provided thereto in these alternative embodiments. In such embodiments, the distribution based on previously stored results is expected to be closer to the optimal distribution than a random distribution, as a result of which less modifications have to be applied to the constellations in the following steps of the algorithm.

As is seen in the second graph two carriers, one of which belongs to subset 1 and the second of which belongs to subset 2, are left unoccupied. Therefore, in step 5, data elements are removed to obtain new constellations without unoccupied carriers. To decide which data elements are removed, the 'required SNR per data element'-tables are consulted. Such a table exists for both subsets of carriers and these tables are stored in 2 table memories similar to the table memories TM1 ... TMN shown in FIG. 1. Such a 'required SNR per data element'-table, as already said in the introduction, is well known in the art. In the present method however, a plurality of these tables is used since each subgroup of carriers has its own table. The two tables corresponding to subset 1 and subset 2 are shown in FIG. 4. Therein, the left table corresponds to subset 1 and the right table corresponds to subset 2. The measured SNR values for each of the carriers f1 ... f11 are listed in the table of FIG.

5. For each carrier, the SNR margin is calculated. These SNR margins are first calculated for each carrier in subset 1 by subtracting the requested SNR from the SNR value measured on each of these carriers. Carrier f1 for example carries 3 data bits in step 4. The SNR measured on f1 equals 22 dB whilst the required SNR allowing f1 to carry 3 data bits is equal to 20 dB. As a result, the SNR margin for f1 equals 2 dB. The SNR margins similarly calculated for f2, f10, f3, f9 and f8 are equal to 0 dB, −1 dB, 7 dB, −1 dB and 2 dB respectively. Since the minimum overall SNR margin equals the overall power decrease that can be performed, data elements are removed from a carrier to an unoccupied carrier in such a way that the minimum SNR margin increases as much as possible. Two carriers, f10 and f9 have an SNR margin of −1 dB. Since 4 data bits are allocated to f10 and 3 data bits are assigned to f9, f10 is more noise sensitive than f9. Therefore, a data bit is removed from f10 to f11. When the same procedure is applied to the second group of fast data elements in FIG. 2, the constellation drawn for step 4 changes into the constellation drawn for step 5.

In the sixth step, the data element allocations are equalised within each group. To perform this equalising the signal, noise ratio (SNR) measurements, supplied to the processor PROC via its second input I2, are again compared to the required signal to noise ratio values stored in the 'required SNR per data element'-tables and applied to the processor PROC via I3. Data elements of the first group are removed from carriers of subset 1 and allocated to other carriers of subset 1 to thereby maximize the minimum SNR margin within this group. The SNR margins for f11, f1, f2, f10, f3, f9 and f8, calculated as already described above, are equal to 1 dB, 2 dB, 0 dB, 2 dB, 7 dB, −1 dB and 2 dB. To increase the minimum SNR margin, a data bit then is removed from the carrier with the least SNR margin to the carrier that has the highest SNR margin after this data bit has been added thereto. In the example of FIG. 2, a data bit, previously allocated to f9 is thus removed therefrom and becomes assigned to carrier f3. As a result, the SNR margin of f9 increases from −1 dB to 3 dB, whilst the SNR margin of f3 remains 7 dB. A further data bit, carried by f2, is not removed therefrom to be added to f3 since this would imply a reduction of the SNR margin of f3 to 3 dB without increase of the SNR margin of f2. The same procedure is followed for equalising the fast data elements allocated to the second subset of carriers. When equalising all data elements in the interleaved group and the fast group in such a way that the minimum remaining SNR margins for all carriers within each group are maximized, the constellation shown in the graph attached to step 6 in FIG. 2 is obtained.

According to the draft ADSL Standard, one bit constellations have to be removed. In step 7 it is therefore checked whether such 1 bit constellations exist or not. If 1 bit constellations are detected, they are upgraded to two bit constellations by removing once more bits from other carriers in a way similar to step 5. It can be seen from the graph attached to step 7 in FIG. 2 that carriers f11 and f5 no longer carry only 1 bit. By removing a first data bit from f2 to f11 and a second data bit from f2 to f3, the SNR margin of f2 is increased from 0 dB to 16 dB. The SNR margin of f11 on the other hand is left unmodified and still equals 1 dB. For each subset of carriers, an optimal data bit allocation is obtained now, i.e. an allocation is found with maximal minimum SNR margins. For subset 1 this minimum SNR margin is equal to 1 dB, for subset 2 the minimum SNR margin equals 3 dB. An overall power decrease of 1 dB can thus be applied if no further steps are performed.

To obtain a data element distribution requiring the least overall power to be transmitted, overall equalization has to be performed in step 8. Indeed, if in step 3 a subset of carriers with large capacity is associated to a group containing a small number of data elements and vice versa, no optimal distribution with respect to overall power transmission will be obtained by executing successively steps 4, 5, 6 and 7. Such a poor division in subsets of carriers always involves the creation of carrier subsets with large SNR margins per carrier and carrier subsets with small SNR margins per carrier. With respect to optimised overall power transmission, the overall minimum SNR margin should be maximized since this results in a minimum overall power transmission. In step 8 it is therefore checked whether it is still possible to remove data elements from a carrier to a carrier of another subset, thereby enlarging the minimum overall SNR margin. If this is still possible, the carriers have to be rearranged in new subsets of carriers comprising a number of carriers that is better tuned to the number of data elements in the respective associated groups of data elements. When applied to the example of FIG. 2, the subsets and data constellations are transformed into the subsets and data constellations shown in the graph attached to step 8. The overall power decrease is increased in step 8 from 1 dB to 2 dB.

Finally it is noticed that in each subset, one carrier might not be completely occupied by data elements since full occupation thereof depends on the actual number of data elements in the associated group. In the example of FIG. 2, the last carrier of the first subset or the first carrier of the second subset is therefore allowed to carry data elements of the group of interleaved data elements as well as of the group of fast data elements. Such a carrier is called a mixed carrier. Whenever it is possible to obtain a configuration with larger SNR margins by the creation of mixed carriers at the edges between two neighbouring subsets, this has to be done in a further step, step 9. The constellation obtained in FIG. 2 in this way is shown in the last graph on the right side.

It has to be noted that although the described embodiment of the modulator is used in ADSL applications, the present method can be implemented in other transmission systems too, e.g. coax cable applications such as DMT (Discrete Multi Tone) for coax, radio transmission applications such as DVB (Digital Video Broadcast), DAB (Digital Audio Broadcast) and mobile communication.

It is also remarked that although the described modulator includes an inverse fast fourier transform processing unit and cyclic prefix adder to convert the frequency domain sequence of data into a time domain sequence of data, it is obvious that the present method can be implemented in a modulator provided with other transformation units, e.g. a DCT (Discrete Cosine Transform) processing unit as is included in a DWMT (Discrete Wavelet Multi Tone) modulator.

Furthermore it is noted that the data criterion does not necessarily have to be related to service dependent requirements. In an alternative implementation of the present method not further described in this patent application, overhead data may constitute a first group of data elements whilst user data constitute a second group of data elements, the user data being allocated to carriers different from the carriers occupied by the overhead data. In another alternative implementation the predetermined data criterion can be equal to the required interleaving depth, this interleaving depth not being determined by the kind of service. Still another alternative implementation of the present method might be based on the insight that different users may require different bandwidths or different maximum bit error rates. In such an implementation, the predetermined data criterion can be user dependent instead of service dependent.

Another remark is that although data elements are classified in two groups and carriers are divided in two subsets in the described embodiment, it is obvious to a person skilled in the art how to adapt the described method and equipment to obtain the situation wherein the data elements are classified in N groups and wherein the carriers are divided into N subsets, N being an arbitrarily chosen integer value. Similarly, it is obvious to a person skilled in the art how to adapt the described embodiment to situations wherein the amount of carriers is different from 11 or 256.

Yet it is noticed that the present allocation method can be executed once, at initialisation of the system wherein it is used, or repeatedly during operation of this system. When executed at initialisation of the system, the obtained data distribution can be stored in a memory means and used during operation. In the latter situation of repeated execution of the method, the data distribution is updated continuously. The required processing time in this situation however is larger.

While the principles of the invention have been described above in connection with specific apparatus, it is to be clearly understood that this description is made only by way of example and not as a limitation on the scope of the invention.

What is claimed is:

1. A method for allocating data elements to a set of carriers for transmission thereof in a communication network, said method including deciding which number of said data elements has to be allocated to a carrier of said set of carriers and measuring a signal to noise ratio for said carrier and combining said signal to noise ratio with information from a required SNR per data element table which defines a required signal to noise ratio per data element allocated to said carrier in said set of carriers, characterized in that said set of carriers is divided into N subsets of carriers according to a predetermined carrier criterion; that is, the sensitivity of a carrier in the set of carriers to occasional noise increase, N being an integer number greater than one, and said N subsets constituting an adaptable partition of said set of carriers, wherein for each of said subsets an own required SNR per data element table is associated which defines a required signal to noise ratio per data element allocated to a carrier in said set of carriers forming part of said subset of carriers, and furthermore that each said data element, before being allocated to a carrier in said set of carriers, is classified in one out of N groups of the data elements according to a predetermined data criterion, there being a relation between said predetermined data criterion and said predetermined carrier criterion on the basis of which each of said N groups of the data elements is associated with a subset of carriers in such a way that a data element, classified in said group, is allocated to said carrier forming part of said subset associated with said group.

2. A method according to claim 1, characterized in that in said communication network, said data elements are provided by a plurality of services, and said predetermined data criterion being a service dependent requirement for protection against said occasional noise increase.

3. A method according to claim 2, characterized in that said occasional noise increase is due to burst errors on connections in said communication network.

4. A method according to claim 2, characterized in that said occasional noise increase is due to clipping of signals transmitted in said communication network.

5. A method according to claim 2, characterized in that said sensitivity of said carrier in said set of carriers to said occasional noise increase is equal to a differential d(SNRdB)/d(No), wherein SNRdB represents the signal to noise ratio in decibels measured on said carrier and wherein No represents the noise power measured on said carrier, said differential representing a variation of said signal to noise ratio SNRdB at a variation of said noise power No and being proportional to 1/No.

6. A method according to claim 2, characterized in that said sensitivity of said carrier in said set of carriers to said occasional noise increase is equal to a differential d(BER)/d(No), wherein BER represents the bit error rate measured for said carrier and wherein No represents the noise power measured on said carrier, said differential representing a variation of said bit error rate BER at a variation of said noise power No.

7. A method according to claim 2, characterized in that said sensitivity of said carrier in said set of carriers to said occasional noise increase is obtained from a spectrum for impulsive noise.

8. A method according to claim 1, characterized in that N−1 of said carriers are mixed carriers, each being shared between two neighbouring ones of said subsets of carriers and allowed therefore to be allocated said data elements classified in two of said groups of data elements associated with one of said two subsets of carriers respectively.

9. A method according to claim 1, characterized in that for each carrier an associated signal to noise ratio margin is minimized to thereby eliminate the possibility to reduce overall power transmission by removing a data element allocated to said carrier in said set of carriers from said carrier to another carrier in said set of carriers, said associated signal to noise ratio margin for each said carrier being equal to SNR-SNRR, wherein SNR represents the signal to noise ratio measured for said carrier and wherein SNRR represents the required signal to noise ratio allowing to modulate on said carrier the number of data elements allocated thereto, SNRR being obtained from a said required SNR per data element table.

10. A method according to claim 1, characterized in that, when said carriers are fictively arranged in decreasing or increasing order of signal to noise ratio measured thereon, no intermediate carriers are left unoccupied, an intermediate carrier being a carrier between a first and last carrier in a sequence of carriers obtained by fictively arranging said carriers in decreasing or increasing order of said signal to noise ratio.

11. A method according to claim 1, characterized in that said communication network is an asymmetric digital subscriber loop (ADSL) access network wherein said data elements are discrete multi tone (DMT) modulated on said set of carriers having equidistant frequencies.

12. A method according to claim 10, characterized in that no one bit constellations occur.

13. A mapping unit (MAP) for allocating data elements to a set of carriers for transmission thereof in a communication network, said mapping unit (MAP) including a signal to noise ratio memory (SNRM) provided to store for each carrier of said set of carriers a signal to noise ratio value, a table memory (TM) provided to store a required SNR per data element table defining a required signal to noise ratio per data element allocated to said carrier in said set of carriers, and a processor (PROC) to a first input (I1) of which said data elements are applied, and to second (I2) and third (I3) inputs of which, outputs of said signal to noise ratio memory (SNRM) and said table memory (TM) are connected respectively, said processor (PROC) being adapted to combine for each said carrier, said signal to noise ratio value with information in said required SNR per data element table to decide which number of said data elements to allocate to each said carrier, characterized in that said table memory (TM) is subdivided into N table memories (TM1 ... TMN), N being an integer greater than one, each table memory being associated with one of N subsets of carriers and provided thus to store a required SNR per data element table defining a required signal to noise ratio per data element allocated to a carrier of said associated one of N subsets of carriers, and furthermore that said processor (PROC) is adapted to divide said set of carriers, according to a predetermined carrier criterion, into said N subsets of carriers constituting an adaptable partition of said set of carriers, to classify said data elements, according to a predetermined data criterion, into N groups of the data elements, said predetermined carrier criterion and said predetermined data criterion having a relation on the basis of which each of said N groups of the data elements is associated with said subset of carriers, and to allocate said data elements to said carriers in such a way that said data elements classified in said group of data elements are allocated to said carriers forming part of said subset associated with said group.

14. A modulator (MOD) for modulation of data elements applied to an input (MI1) thereof on a set of carriers for transmission thereof in a communication network coupled to an output (MO) thereof, said modulator (MOD) including between said input (MI1) and said output (MO) a cascade connection of a mapping unit (MAP), a transformation unit (IFFT, CPA), a parallel to serial converter (PSC) and a digital to analog converter (DAC), said mapping unit (MAP) being provided to allocate said data elements to said set of carriers and to thereby generate a frequency domain parallel sequence of data, said transformation unit (IFFT, CPA) being included to transform said frequency domain parallel sequence of data applied to its input and to thereby generate a time domain parallel sequence of data, said parallel to serial converter (PSC) being adapted to convert said time domain parallel sequence of data into a serial sequence of data which is applied to said digital to analog converter included to transform said serial sequence of data into an analog signal and to supply said analog signal to said output (MO) of said modulator (MOD), said mapping unit (MAP) including a signal to noise ratio memory (SNRM) provided to store for each carrier of said set of carriers a signal to noise ratio value, a table memory (TM) provided to store a required SNR per data element table defining a required signal to noise ratio per data element allocated to said carrier in said set of carriers, and a processor (PROC) to a first input (I1) of which said data elements are applied, and to second (I2) and third (I3) inputs of which, outputs of said signal to noise ratio memory (SNRM) and said table memory (TM) are connected respectively, said processor (PROC) being adapted to combine for each said carrier, said signal to noise ratio value with information in said required SNR per data element table to decide which number of said data elements to allocate to each said carrier, characterized in that said table memory (TM) is subdivided into N table memories (TM1 ... TMN), N being an integer greater than one, each table memory being associated with one of N subsets of carriers and provided thus to store a required SNR per data element table defining a required signal to noise ratio per data element allocated to a carrier of said associated subset of carriers, and furthermore that said processor (PROC) is adapted to divide said set of carriers, according to a predetermined carrier criterion, into said N subsets of carriers constituting an adaptable partition of said set of carriers, to classify said data elements, according to a predetermined data criterion, into N groups of the data elements, said predetermined carrier criterion and said predetermined data criterion having a relation on the basis of which each of said N groups of the data elements is associated with a subset of carriers, and to allocate said data elements to said carriers in such a way that said data elements classified in said group of data elements are allocated to said carriers forming part of said subset associated with said group.

* * * * *